(12) United States Patent
Georgin et al.

(10) Patent No.: US 12,403,874 B2
(45) Date of Patent: Sep. 2, 2025

(54) PEDAL PROCESSING FOR PRIMARY / ALTERNATE AIRCRAFT BRAKING SYSTEM ARCHITECTURE

(71) Applicant: Goodrich Corporation, Charlotte, NC (US)

(72) Inventors: Marc J. Georgin, Dayton, OH (US); Paul R. Burte, Clayton, OH (US); Lane B. Robbins, Pleasant Hill, OH (US); Richard A. Poisson, Avon, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 710 days.

(21) Appl. No.: 17/848,251

(22) Filed: Jun. 23, 2022

(65) Prior Publication Data
US 2023/0415714 A1    Dec. 28, 2023

(51) Int. Cl.
| | | |
|---|---|---|
| *B64C 25/44* | (2006.01) | |
| *B60T 7/04* | (2006.01) | |
| *B60T 8/17* | (2006.01) | |
| *B60T 13/68* | (2006.01) | |
| *B60T 17/22* | (2006.01) | |

(52) U.S. Cl.
CPC ............ *B60T 8/1703* (2013.01); *B60T 7/042* (2013.01); *B60T 13/686* (2013.01); *B60T 17/22* (2013.01); *B64C 25/44* (2013.01); *B60T 2220/04* (2013.01); *B60T 2270/404* (2013.01); *B60T 2270/413* (2013.01); *B60T 2270/82* (2013.01)

(58) Field of Classification Search
CPC ................ B64C 25/44; B60T 2220/04; B60T 2270/404; B60T 2270/413; B60T 8/1703
See application file for complete search history.

(56) References Cited

U.S. PATENT DOCUMENTS

| | | | |
|---|---|---|---|
| 5,954,407 A * | 9/1999 | Schramm ............. | B60T 8/3255 303/155 |
| 7,437,231 B2 | 10/2008 | Kolberg | |
| 8,565,939 B2 | 10/2013 | Cahill | |
| 2004/0239173 A1 | 12/2004 | Williams et al. | |
| 2009/0240412 A1* | 9/2009 | Cahill ..................... | B64C 25/44 303/20 |
| 2010/0228430 A1* | 9/2010 | Cahill ..................... | B60T 7/042 701/29.2 |
| 2010/0292889 A1 | 11/2010 | Cahill et al. | |

(Continued)

OTHER PUBLICATIONS

European Patent Office, European Search Report dated Dec. 13, 2023 in Application No. 23181047.4.

*Primary Examiner* — Bradley T King
(74) *Attorney, Agent, or Firm* — SNELL & WILMER L.L.P.

(57) ABSTRACT

An aircraft braking system is disclosed that includes a first pedal, first and second pedal sensors for the first pedal, a first brake control unit (e.g., primary), and a separate second brake control unit (e.g., secondary). The first pedal position sensor is operatively interconnected with one of the first brake control unit and the second brake control unit, while the second pedal position sensor is operatively interconnected with the other of the first brake control unit and the second brake control unit. Outputs from these pedal sensors may be used to control operation of the aircraft braking system in at least some fashion.

20 Claims, 6 Drawing Sheets (56) References Cited

U.S. PATENT DOCUMENTS

| | | | |
|---|---|---|---|
| 2011/0040466 A1* | 2/2011 | Hill | B60T 8/885 |
| | | | 701/74 |
| 2015/0129368 A1 | 5/2015 | Cahill | |
| 2018/0029567 A1 | 2/2018 | Cahill | |
| 2018/0105259 A1 | 4/2018 | Cahill et al. | |
| 2018/0222457 A1 | 8/2018 | Cahill | |
| 2018/0297565 A1* | 10/2018 | Georgin | B60T 8/1703 |
| 2021/0206357 A1 | 7/2021 | Yamamoto et al. | |
| 2022/0097832 A1 | 3/2022 | Georgin et al. | |
| 2023/0159011 A1* | 5/2023 | Georgin | B60T 8/1703 |
| | | | 701/3 |
| 2023/0249808 A1* | 8/2023 | Georgin | B60T 8/325 |
| | | | 701/70 |

* cited by examiner

PEDAL PROCESSING FOR PRIMARY / ALTERNATE AIRCRAFT BRAKING SYSTEM ARCHITECTURE

FIELD

The present disclosure generally relates to the field of aircraft and, more particularly, to control of aircraft braking systems.

BACKGROUND

An aircraft braking system may utilize multiple brake control units, including where both the pilot and co-pilot each have a set of pedals to control the aircraft braking system. Multiple brake control units and multiple sets of pedals each may be utilized for redundancy, but can also result in a certain degree of complexity. In any case and regardless of complexities, an aircraft braking system should be configured to reduce the potential for un-commanded braking during at least certain conditions, such as during takeoff.

SUMMARY

An aircraft braking system is presented herein. Both the configuration of such an aircraft braking system and the operational characteristics/operation of such an aircraft braking system are within the scope of this Summary. The aircraft braking system includes at least one pedal (e.g., a first pedal), a first pedal position sensor for this first pedal, a second pedal position sensor for this first pedal, a first brake control unit, and a second brake control unit. The first pedal position sensor is operatively interconnected with one of the first brake control unit and the second brake control unit (i.e., the first pedal position sensor is not operatively connected with both the first brake control unit and the second brake control unit), while the second pedal position sensor is operatively interconnected with the other of the first brake control unit and the second brake control unit (i.e., the second pedal position sensor is not operatively connected with both the first brake control unit and the second brake control unit). A comparison module (e.g., in software or hardware) is configured to compare a first output with a second output. The first output is provided by the first brake control unit from an output of the first pedal position sensor and that relates to a first pedal position of the first pedal. The second output is provided by the second brake control unit from an output of the second pedal position sensor and that relates to a second pedal position. A first condition precludes operation of the aircraft braking system in response to a displacement of the first pedal. This first condition exists when: 1) the comparison module receives the first output from the first brake control unit; 2) the comparison module receives the second output from the second brake control unit; and 3) the comparison module determines that the first output and the second output fail to comply with a first predetermined standard (e.g., the first output and the second output do not adequately match one another or are not within a predetermined threshold of one another in one or more aspects).

Various aspects of the present disclosure are also addressed by the following examples and in the noted combinations:

1. An aircraft braking system comprising:
    a first pedal pair comprising a first pedal and a second pedal;
    a first pedal position sensor for said first pedal;
    a second pedal position sensor for said first pedal;
    a first brake control unit;
    a second brake control unit, wherein said first pedal position sensor is operatively interconnected with one of said first brake control unit and said second brake control unit and said second pedal position sensor is operatively interconnected with the other of said first brake control unit and said second brake control unit; and
    a first comparison module configured to compare a first output with a second output, wherein said first output is provided by said first brake control unit from an output of said first pedal position sensor and relates to a first pedal position of said first pedal, wherein said second output is provided by said second brake control unit from an output of said second pedal position sensor and relates to a second pedal position, and wherein said first brake control unit comprises said first comparison module;
    wherein a first condition precludes operation of said aircraft braking system in response to displacement of said first pedal, said first condition comprising: 1) said first comparison module receiving said first output from said first brake control unit and receiving said second output from said second brake control unit; and 2) said first comparison module determining that said first output and said second output fail to comply with a first predetermined standard.
2. The aircraft braking system of paragraph 1, wherein said first output comprises both a validity and magnitude relating to said first pedal position, and wherein said second output comprises both a validity and magnitude of said second pedal position.
3. The aircraft braking system of any of paragraphs 1-2, wherein one of said first brake control unit and said second brake control unit is a primary brake control unit and the other of said first brake control unit and said second brake control unit is a secondary brake control unit.
4. The aircraft braking system of any of paragraphs 1-3, wherein said first brake control unit comprises a first outboard brake control card (BCC) and a first inboard BCC, wherein said second brake control unit comprises a second outboard BCC and a second inboard BCC, and wherein said first inboard BCC of said first brake control unit comprises said first comparison module.
5. The aircraft braking system of paragraph 4, wherein said first pedal position sensor is operatively interconnected with said first inboard BCC of said first brake control unit and said second pedal position sensor is operatively interconnected with said second outboard BCC of said second brake control unit.
6. The aircraft braking system of paragraph 5, wherein said first output is provided by said first inboard BCC of said first brake control unit and said second output is provided by said second outboard BCC of said second brake control unit.
7. The aircraft braking system of any of paragraphs 5-6:
    wherein said first inboard BCC of said first brake control unit comprises said first comparison module, a first module, and a second module;
    wherein said first module utilizes a third output from said first comparison module and a fourth output, wherein said fourth output is provided by said first brake control unit from an output of said first pedal position sensor and relates to said first pedal position of said first pedal; and wherein said first module outputs a fifth output to said second module.

8. The aircraft braking system of paragraph 7, wherein a sixth output is provided by said first brake control unit to said second module from an output of said first pedal position sensor and that relates to a third pedal position of said first pedal, and wherein said second module is operatively interconnected with a first shut-off valve driver that opens a first shut-off valve of said aircraft braking system when said fifth output satisfies a first condition and said sixth output satisfies a second condition.

9. The aircraft braking system of paragraph 8, wherein satisfaction of said first condition at least requires said first pedal position to be both above a first predetermined threshold and to be valid, and wherein satisfaction of said second condition at least requires said third pedal position to be above a second predetermined threshold.

10. The aircraft braking system of any of paragraphs 8-9:

wherein said first outboard BCC of said first brake control unit comprises a third module;

wherein said first module also transmits said fifth output to said third module;

wherein said first inboard BCC of said first brake control until also transmits said sixth output to said third module; and wherein said third module is operatively interconnected with a second shut-off valve driver that opens a second shut-off valve of said aircraft braking system when said fifth output satisfies said first condition and said sixth output satisfies said second condition.

11. The aircraft braking system of paragraph 10, wherein said first module transmits said fifth output to said third module via an internal serial transmitter of said first inboard BCC of said first brake control unit and an internal serial receiver of said first outboard BCC of said first brake control unit.

12. The aircraft braking system of any of paragraphs 8-11, wherein said first and second pedal positions are digital values and said third pedal position is an analog value.

13. The aircraft braking system of any of paragraphs 8-12, wherein said comparison module and said first module are each software modules and said second module is a hardware module.

14. The aircraft braking system of paragraph 13, wherein said second module comprises an AND gate.

15. The aircraft braking system of any of paragraphs 4-13, wherein said first inboard BCC controls operation of at least one inboard aircraft brake and said first outboard BCC controls operation of at least one outboard aircraft brake.

16. The aircraft braking system of any of paragraphs 1-15, wherein said first pedal position is a first software pedal position and said second pedal position is a second software pedal position.

17. The aircraft braking system of any of paragraphs 4-16, further comprising:

a first external signal line between said first inboard BCC of said first brake control unit and said second outboard BCC of said second brake control unit, wherein said second output is provided by said second outboard BCC of said second brake control unit to said inboard BCC of said first brake control unit via said first external signal line.

18. An aircraft braking system comprising:

a first pedal pair comprising a first pedal and a second pedal;

a first brake control unit operatively interconnected with a first pedal position sensor for said first pedal;

a second brake control unit operatively interconnected with a second pedal position sensor for said first pedal;

wherein the first brake control unit is configured to compare an output of said first pedal position sensor with an output provided by the second brake control unit based on an output of said second pedal position sensor and to preclude braking operation if the comparison reveals that the first output and second output fail to comply with a first predetermined standard.

19. A method of controlling an aircraft braking system comprising a first pedal, a first brake control unit, and a second brake control unit, said method comprising:

outputting a first signal from a first pedal position sensor to said first brake control unit regarding a position of said first pedal;

outputting a second signal from a second pedal position sensor to said second brake control unit regarding said position of said first pedal;

said first brake control unit providing a first output that relates to a first pedal position of said first pedal;

said second brake control unit providing a second output that relates to a second pedal position of said first pedal;

comparing said first output with said second output; and precluding operation of said aircraft braking system in response to displacement of said first pedal and for a first condition comprising: 1) said comparing receiving said first output from said first brake control unit and receiving said second output from said second brake control unit; and 2) said comparing determining that said first output and said second output fail to comply with a first predetermined standard.

20. The method of any of paragraph 19, wherein said first brake control unit comprises a first outboard brake control card (BCC) and a first inboard BCC, wherein said second brake control unit comprises a second outboard BCC and a second inboard BCC, and wherein said first inboard BCC executes comparing step.

21. The method of paragraph 20, wherein said providing a first output is executed by said inboard BCC of said first brake control unit and said providing a second output is executed by said outboard BCC of said second brake control unit.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

As used herein, a first component that is "radially outward" of a second component means that the first component is positioned at a greater distance away from a common axis (e.g., a rotational axis of a wheel assembly) than the second component. A first component that is "radially inward" of a second component means that the first component is positioned closer to the common axis than the second component. In the case of components that rotate about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
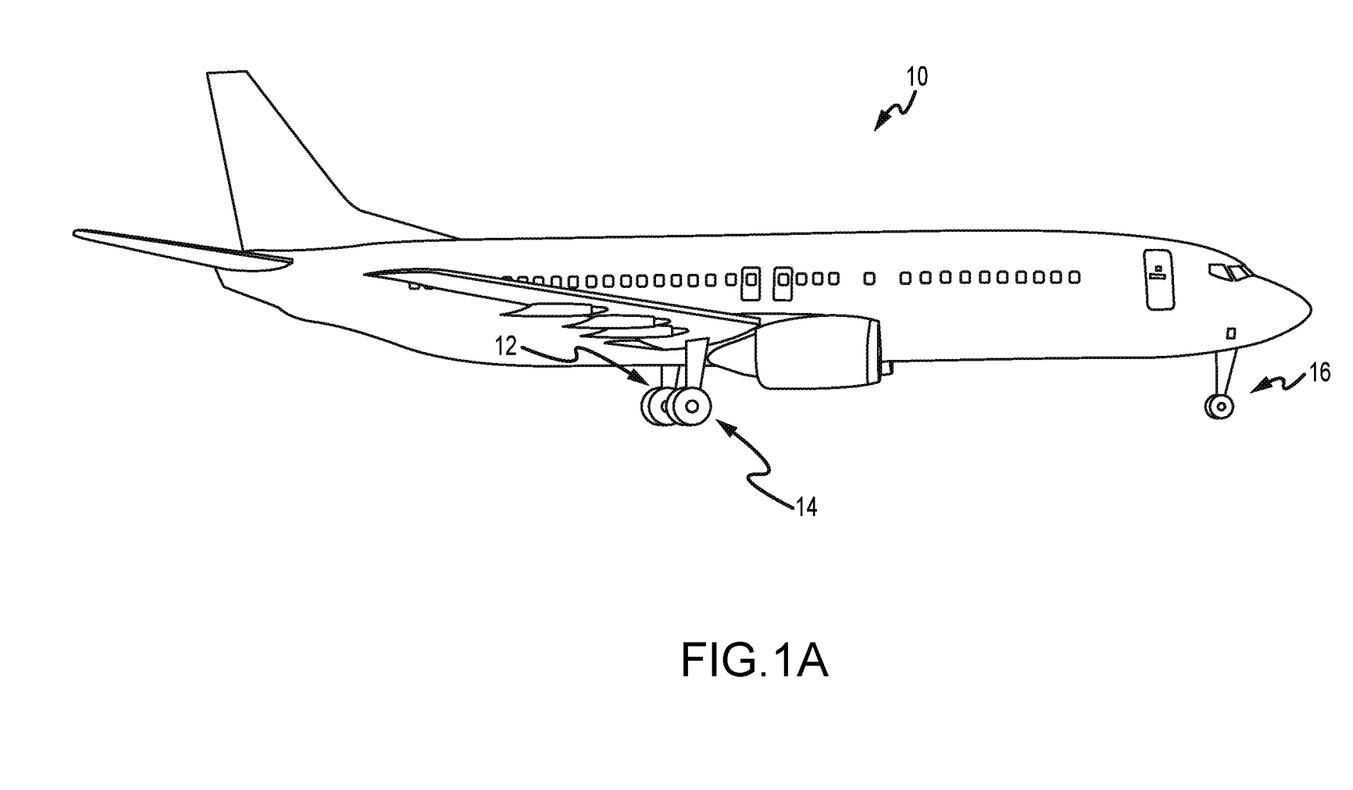
FIG. 1A illustrates an exemplary aircraft having a brake assembly in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
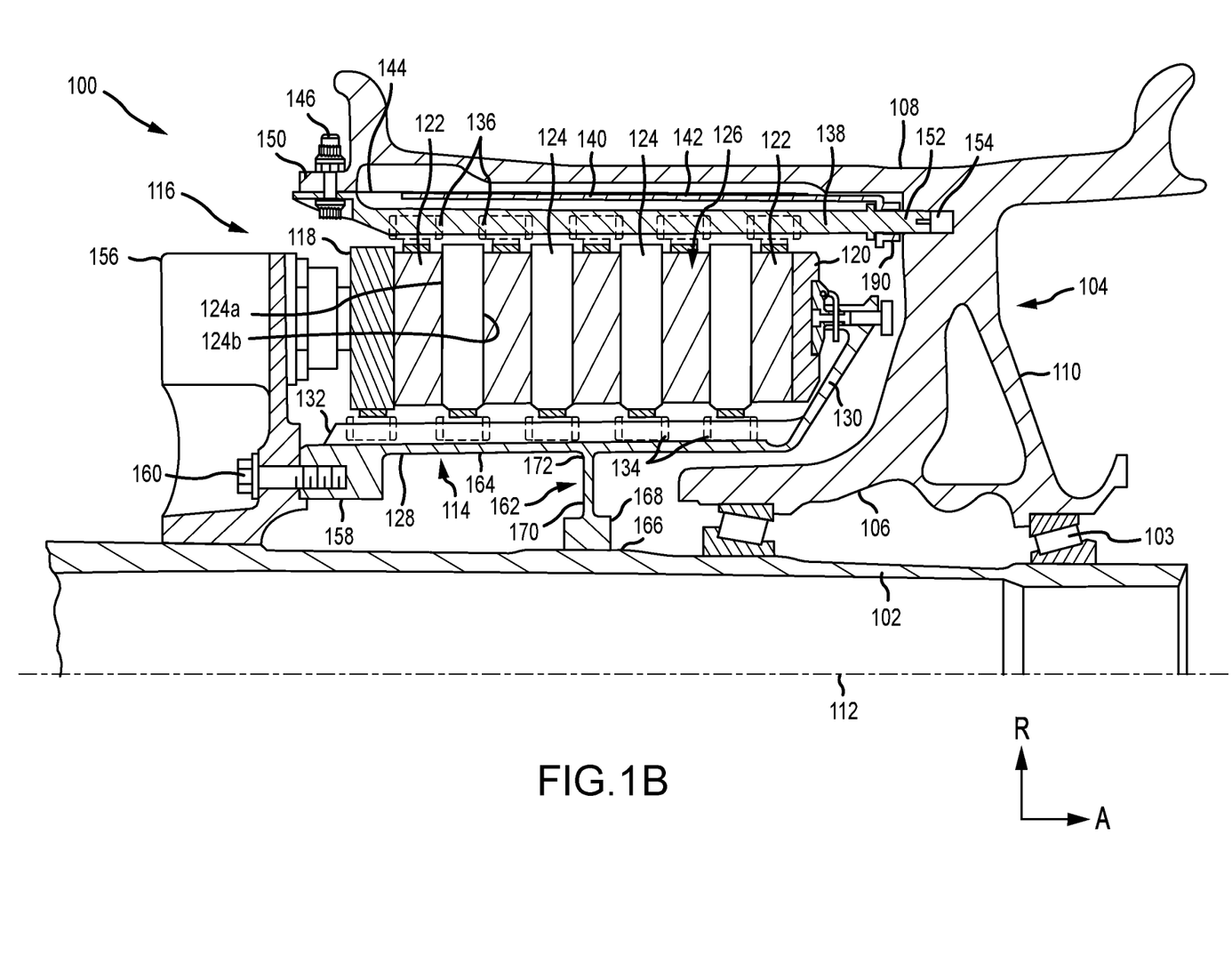
FIG. 1B illustrates a cross-sectional view of a brake assembly in accordance with various embodiments.

Referring now to FIG. 1B, there is schematically depicted a brake assembly or a brake mechanism 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102. Each stator disk 124 includes a pair of oppositely disposed sides 124a, 124b that each interface with a corresponding rotor disk 122 during a braking operation.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Figure 2:
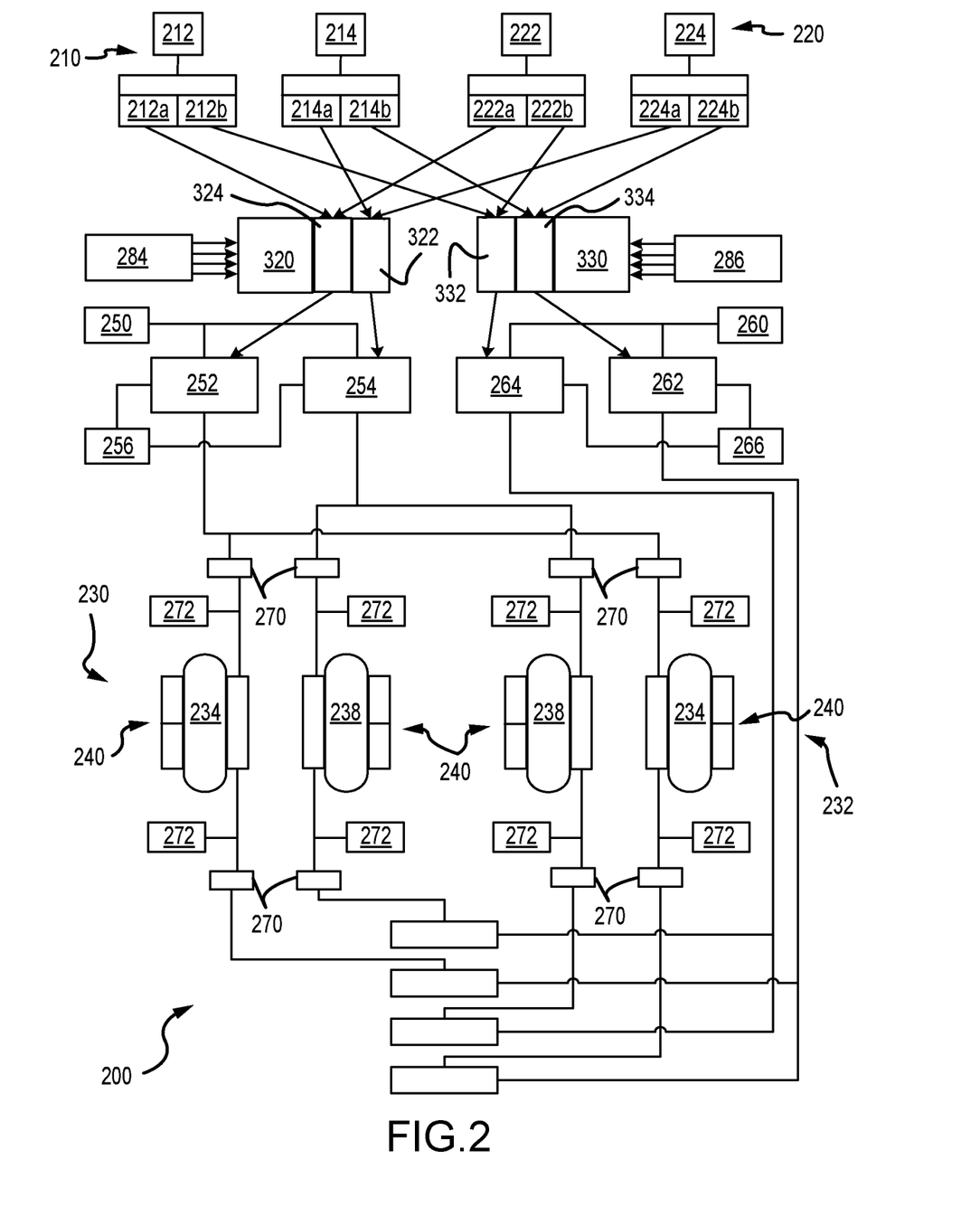
FIG. 2 is a schematic of an aircraft braking system in accordance with various embodiments.

An aircraft braking system is illustrated in FIG. 2 and is identified by reference numeral 200. The aircraft braking system 200 is illustrated in conjunction with an outboard wheel 234 and an inboard wheel 238 on each of a port side 230 and a starboard side 232 of an aircraft. A separate brake 240 is provided for each of the outboard wheels 234 and the inboard wheels 238. A hydraulic system A pressure source 250 is fluidly connected with an outboard dual brake control valve module 252 (in turn fluidly connected with the brake 240 for each of the outboard wheels 234) and an inboard dual brake control valve module 254 (in turn fluidly connected with the brake 240 for each of the inboard wheels 238). The aircraft braking system 200 further includes a hydraulic system A return 256. Similarly, a hydraulic system B pressure source 260 is fluidly connected with an outboard dual brake control valve module 262 (in turn fluidly connected with the brake 240 for each of the outboard wheels 234) and an inboard dual brake control valve module 264 (in turn fluidly connected with the brake 240 for each of the inboard wheels 238). The aircraft braking system 200 further includes a hydraulic system B return 266. The aircraft braking system further includes a plurality of hydraulic fuses 270, pressure transducers 272, a 28 VDC (DC voltage) bus 284, and a 28 VDC bus 286.

The above-noted brake control modules 252, 254, 262, 264 may each utilize one or more servo valves, one or more shut-off valves, or the like. Each shut-off valve for each of the above-noted brake control modules 252, 254, 262, 264 is disposed in the flowpath between its corresponding hydraulic system pressure source and its corresponding servo valve(s), with each shut-off valve being movable between an open and closed position in relation to the flow to its corresponding servo valve(s), and with each servo valve controlling the amount of flow to the brake of the corresponding wheel(s) (more specifically the braking pressure applied to the corresponding wheel(s)). As such, the shut-off valve(s) for each of the outboard dual brake control valve module 252 and the inboard dual brake control valve module 254 is disposed between its corresponding servo valve(s) and the hydraulic system A pressure source 250. Similarly, the shut-off valve(s) for each of the outboard dual brake control valve module 262 and the inboard dual brake control valve module 264 is disposed between its corresponding servo valve(s) and the hydraulic system B pressure source 260.

The aircraft braking system 200 of FIG. 2 further includes a first or pilot pedal pair 210 and a second/co-pilot pedal pair 220. The first pedal pair 210 includes a first (e.g., left) pedal 212 and a second (e.g., right) pedal 214. A first pedal position sensor 212a and a second pedal position sensor 212b monitor the position of the first pedal 212 (e.g., displacement of the first pedal 212). Similarly, a first pedal position sensor 214a and a second pedal position sensor 214b monitor the position of the second pedal 214 (e.g., displacement of the second pedal 214). The second pedal pair 220 includes a first (e.g., left) pedal 222 and a second (e.g., right) pedal 224. A first pedal position sensor 222a and a second pedal position sensor 222b monitor the position of the first pedal 222 (e.g., displacement of the first pedal 222). Similarly, a first pedal position sensor 224a and a second pedal position sensor 224b monitor the position of the second pedal 224 (e.g., displacement of the second pedal 224). Each of the pedal position sensors 212a/b, 214 a/b, 222a/b, and 224 a/b may be in the form of a linear variable differential transformer (LVDT).

The aircraft braking system 200 utilizes both a first (e.g., primary) brake control unit (BCU) 320 and a second (e.g., secondary or alternate) BCU 330. The first BCU 320 includes an inboard brake control card (BCC) 322 and an outboard BCC 324. Similarly, the second BCU 330 includes an inboard BCC 332 and an outboard BCC 334. FIG. 2 illustrates the following: 1) an output of the first pedal position sensor 212a for the first pedal 212 (first pedal pair 210) is provided to the outboard BCC 324 of the first BCU 320; 2) an output of the second pedal position sensor 212b for the first pedal 212 (first pedal pair 210) is provided to the inboard BCC 332 of the second BCU 330; 3) an output of the first pedal position sensor 214a for the second pedal 214 (first pedal pair 210) is provided to the inboard BCC 322 of the first BCU 320; 4) an output of the second pedal position sensor 214b for the second pedal 214 (first pedal pair 210) is provided to the outboard BCC 334 of the second BCU 330; 5) an output of the first pedal position sensor 222a for the first pedal 222 (second pedal pair 220) is provided to the outboard BCC 324 of the first BCU 320; 6) an output of the second pedal position sensor 222b for the first pedal 222 (second pedal pair 220) is provided to the inboard BCC 332 of the second BCU 330; 7) an output of the first pedal position sensor 224a for the second pedal 224 (second pedal pair 220) is provided to the inboard BCC 322 of the first BCU 320; and 8) an output of the second pedal position sensor 224b for the second pedal 224 (second pedal pair 220) is provided to the outboard BCC 334 of the second BCU 330.

Figure 3A:
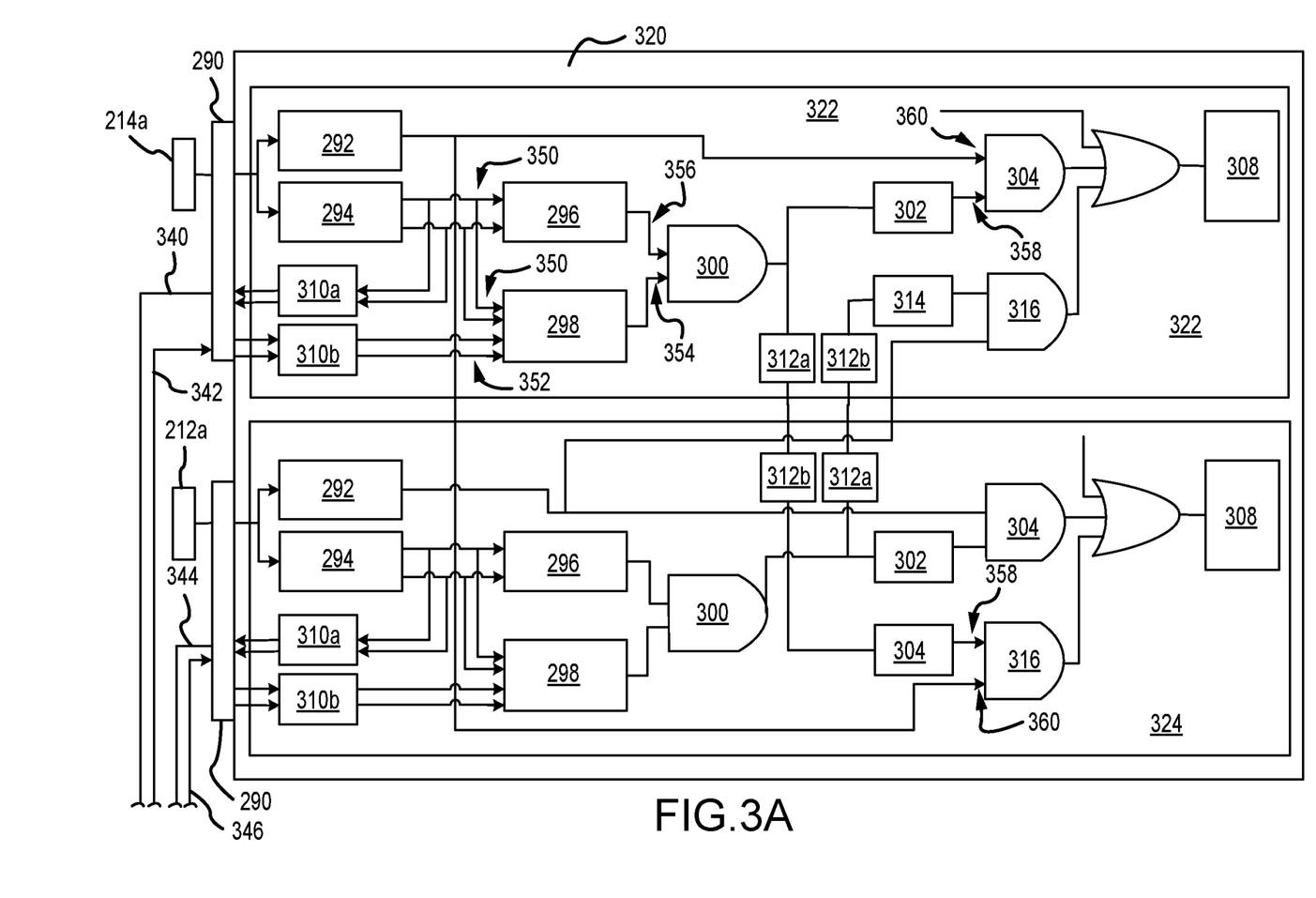
FIG. 3A is a functional schematic of a primary brake control unit in accordance with various embodiments.
Figure 3B:
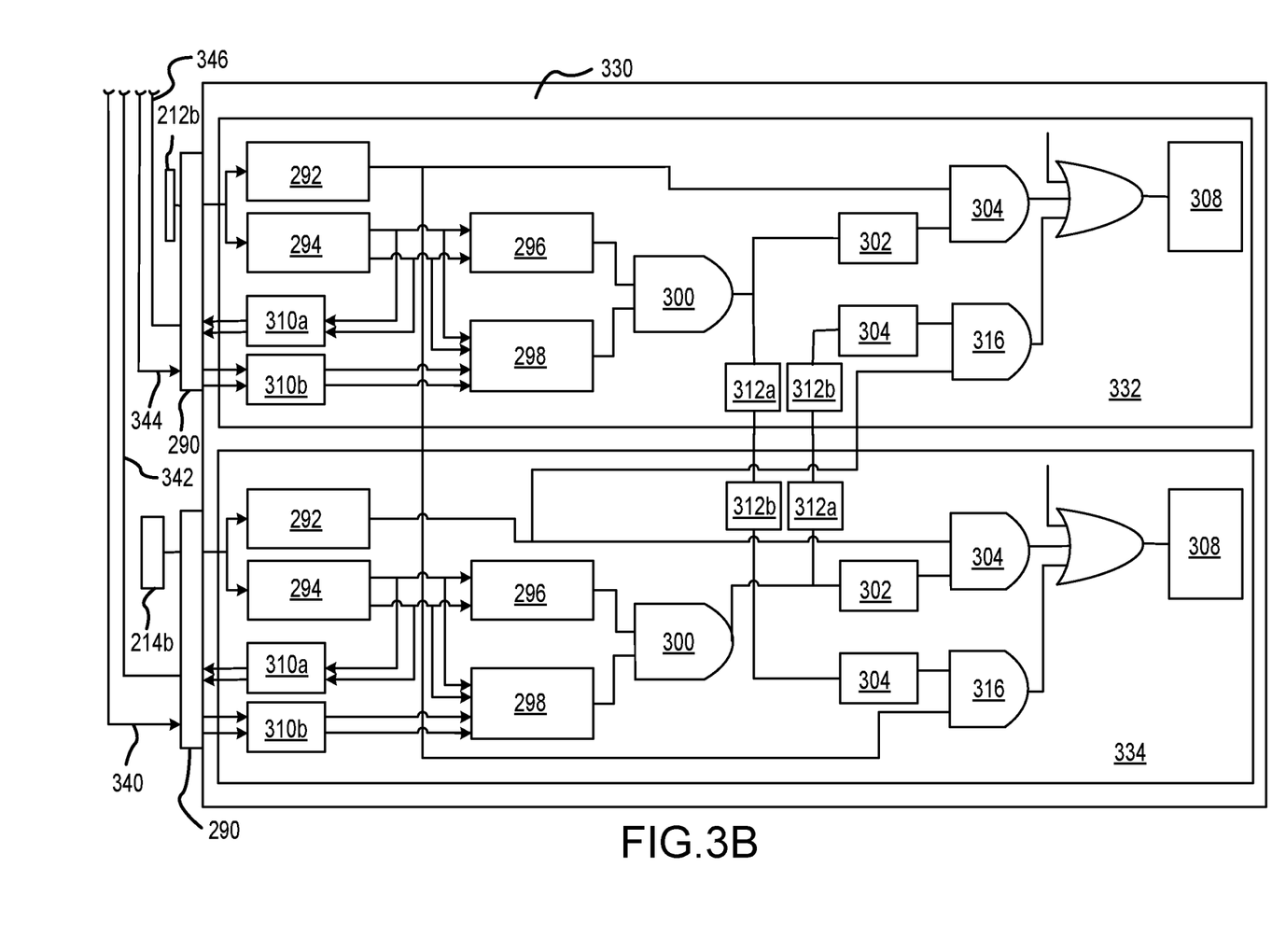
FIG. 3B is a functional schematic of a secondary brake control unit in accordance with various embodiments.

FIGS. 3A and 3B present further details regarding the first BCU 320 and the second BCU 330 from the aircraft braking system 200 of FIG. 2. The first BCU 320 again includes an inboard BCC 322 and an outboard BCC 324 (FIG. 3A), while the second BCU 330 includes an inboard BCC 332 and an outboard BCC 334 (FIG. 3B). The inboard BCC 322 and the outboard BCC 324 of the first BCU 320 each include an external connector 290. Similarly, the inboard BCC 332 and the outboard BCC 334 of the second BCU 330 each include an external connector 290. These external connectors 290 accommodate external communications.

The inboard BCC 322 of the first BCU 320 shown in FIG. 3A may be for the right pedal 214 of the first pedal pair 210 of FIG. 2 and includes the first pedal position sensor 214*a* (or may be for the right pedal 224 of the second pedal pair 220 of FIG. 2 in which case the inboard BCC 322 of the first BCU 320 of FIG. 3A would then include the first pedal position sensor 224*a*); 2) the outboard BCC 334 of the second BCU 330 shown in FIG. 3B may be for the right pedal 214 of the first pedal pair 210 of FIG. 2 and includes the second pedal position sensor 214*b* (or may be for the right pedal 224 of the second pedal pair 220 of FIG. 2 in which case the outboard BCC 334 of the second BCU 330 of FIG. 3B would then include the second pedal position sensor 224*b*); 3) the outboard BCC 324 of the first BCU 320 shown in FIG. 3A may be for the left pedal 212 of the first pedal pair 210 of FIG. 2 and includes the first pedal position sensor 212*a* (or may be for the left pedal 222 of the second pedal pair 220 of FIG. 2 in which case the outboard BCC 324 of the first BCU 320 of FIG. 3A would then include the first pedal position sensor 222*a*); and 4) the inboard BCC 332 of the second BCU 330 shown in FIG. 3B may be for the left pedal 212 of the first pedal pair 210 of FIG. 2 and includes the second pedal position sensor 214*b* (or may be for the left pedal 222 of the second pedal pair 220 of FIG. 2 in which case the inboard BCC 332 of the second BCU 330 of FIG. 3B would then include the second pedal position sensor 224*b*).

Transmissions from the inboard BCC 322 of the first BCU 320 to the outboard BCC 334 of the second BCU 330 are transmitted via a signal line 340 that extends between the corresponding external connectors 290. Transmissions from the outboard BCC 334 of the second BCU 330 are transmitted to the inboard BCC 322 of the first BCU 320 via a signal line 342 that extends between the corresponding external connectors 290. Transmissions from the outboard BCC 324 of the first BCU 320 are transmitted to the inboard BCC 332 of the second BCU 330 via a signal line 344 that extends between the corresponding external connectors 290. Transmissions from the inboard BCC 332 of the second BCU 330 are transmitted to the outboard BCC 324 of the first BCU 320 via a signal line 346 that extends between the corresponding external connectors 290. Details regarding the above-noted transmissions will be discussed in more detail below.

The inboard BCC 322 of the first BCU 320, the outboard BCC 324 of the first BCU 320, the inboard BCC 332 of the second BCU 330, and the outboard BCC 334 of the second BCU 330 each include the following components, and with the lines between components in FIGS. 3A and 3B being signal lines (certain outputs on one or more of the signal lines are addressed below and are identified by an additional reference numeral): a pedal position determination module 292 (e.g., a hardware pedal determination module 292); a pedal position determination module 294 (e.g. a software pedal position determination module 294); a threshold/validity module 296; an agreement/validity module 298 (or a comparison module 298); a first module 300 (e.g., providing an "AND" functionality when the first module 300 is of a software configuration); digital outputs 302/314; modules or AND gates 304/316 (when of a hardware configuration); an external serial transmitter 310*a*; an external serial receiver 310*b*; an internal serial transmitter 312*a*; and an internal serial receiver 312*b*.

A representative operation of the aircraft braking system 200 will now be addressed for the right pedal 214 of the first pedal pair 210 (FIG. 2) in relation to FIGS. 3A and 3B. Operation (e.g., displacement) of the right pedal 214 is monitored by the first pedal position sensor 214*a* (a corresponding signal being transmitted to the external connector 290 of the inboard BCC 322 of the first BCU 320 (FIG. 3A)). The pedal position determination module 292 of the inboard BCC 322 of the first BCU 320 will determine/calculate a third pedal position (e.g., analog; a hardware pedal position) from the signal provided by the first pedal position sensor 214*a*. This third pedal position is assessed by the inboard BCC 322 of the first BCU 320 to determine if it satisfies a predetermined threshold (e.g., is greater than a predetermined value). If so, a sixth output 360 in the form of a "TRUE" value/condition is transmitted to the AND gate 304 of the inboard BCC 322 of the first BCU 320. Otherwise, a sixth output 360 in the form of a "FALSE" value/condition is transmitted to the AND gate 304 of the inboard BCC 322 of the first BCU 320. In any case, the pedal position determination module 292 or another module of the inboard BCC 322 of the first BCU 320 could provide the assessment as to whether the third pedal position satisfies the corresponding predetermined threshold.

The pedal position determination module 294 of the inboard BCC 322 of the first BCU 320 will determine/calculate a first pedal position (e.g., digital; a first software pedal position) from the signal provided by the first pedal position sensor 214*a*, and this first pedal position is then transmitted to both the threshold/validity module 296 and the agreement/validity module 298 of the inboard BCC 322 of the first BCU 320 (e.g., a first output 350). In the event that the threshold/validity module 296 of the inboard BCC 322 of the first BCU 320 determines that the first pedal position is above a predetermined value (e.g., greater than 15% activation of the right pedal 214) and is valid, a fourth output 356 in the form of "TRUE" value/condition is transmitted from the threshold/validity module 296 to the first module 300. Otherwise, a fourth output 356 in the form of "FALSE" value/condition is transmitted from the threshold/validity module 296 to the first module 300.

The software pedal position determination module 294 of the outboard BCC 334 of the second BCU 330 will determine/calculate a second pedal position (e.g., digital; a second software pedal position) from the signal provided by the second pedal position sensor 214*b* for the first pedal 214, and this second pedal position is then transmitted (e.g., in the form of a second output 352) to the external serial transmitter 310*a*, then to the external connector 290 of the outboard BCC 334 of the second BCU 330, then to the external connector 290 of the inboard BCC 322 of the first BCU 20 via the signal line 340, then to the external serial receiver 310*b* of the inboard BCC 322 of the first BCU 320, and then to the agreement/validity module 298 of the inboard BCC 322 of the first BCU 320. If the agreement/validity module 298 determines that the first pedal position (as determined/calculated by the inboard BCC 322 of the first BCU 320) and the second pedal position (as determined/calculated by the outboard BCC 334 of the second BCU 330) are in agreement (e.g., within a predetermined value of each other) and are each valid, a third output 354 in the form of a "TRUE" value/condition is transmitted by the agreement/validity module 298 to the first module 300 (e.g., which provides an "AND" functionality. Otherwise, a third output 354 in the form of "FALSE" value/condition is transmitted from the agreement/validity module 298 to the first module 300.

If each input to the first module 300 is of a "TRUE" condition/value, a fifth output 358 in the form of a "TRUE" value/condition is transmitted by the first module 300 to the AND gate 304 of the inboard BCC 322 of the first BCU 320. Otherwise, a fifth output 358 in the form of a "FALSE" value/condition is transmitted from the first module 300 to the AND gate 304 of the inboard BCC 322 of the first BCU 320. In the event that the second BCU 330 is not operational (and thereby does not provide the second pedal position to the agreement/validity module 298 of the inboard BCC 322 for the primary BCU 320), the agreement/validity module 298 would not send any output to the first module 300. In this case, any "TRUE" output from the first module 300 would be based solely on the first signal value from the signal provided by the first pedal position sensor 214a to allow for operation of the aircraft braking system 200 even with the second BCU 330 not being operational.

With continued reference to the inboard BCC 322 of the first BCU 320, if the first module 300 transmits a fifth output 358 (in the form of a "TRUE" value/condition) to the AND gate 304 and if the third pedal position (determined/calculated by the pedal position module 292) also results in the transmission of a sixth 360 output (in the form of a "TRUE" value/condition) to the AND gate 304, the corresponding shut-off valve driver 308 is activated. The shut-off valve driver 308 of the inboard BCC 322 of the first BCU 320 is operatively interconnected with the inboard dual brake control valve module 254 (FIG. 2), more specifically its corresponding shut-off valve(s), and when activated disposes its corresponding shut-off valve(s) in the open position. Activating the shut-off valve driver 308 (of the inboard BCC 322 of the first BCU 320) allows pressurized hydraulic fluid to be provided to the corresponding servo valve(s) of the inboard dual brake control valve module 254 for the aircraft braking system 200 of FIG. 2 (these servo valves being separately controlled as to the braking pressure that is ultimately applied to the corresponding brake(s) 240 of the aircraft braking system 200 (e.g., brakes 240 for the inboard wheels 238)). Otherwise, the shut-off valve driver 308 (of the inboard BCC 322 of the first BCU 320) is maintained in a deactivated state (e.g., such that the shut-off valve(s) for the inboard dual brake control valve module 254 is maintained in its closed position such that pressurized hydraulic fluid is not provided to the corresponding servo valve(s) of the inboard dual brake control valve module 254 for the aircraft braking system 200 of FIG. 2).

The inboard BCC 322 of the first BCU 320 communicates with the outboard BCC 324 of the first BCU 320 along multiple paths regarding operation (e.g., displacement) of the right pedal 214 in accordance with the foregoing. If the third pedal position (determined/calculated by the pedal position determination module 292 of the inboard BCC 322 of the first BCU 320) is determined to satisfy a predetermined threshold in accordance with the foregoing (e.g., is greater than a predetermined value), the above-noted sixth output 360 in the form of "TRUE" value/condition is also transmitted to the AND gate 316 of the outboard BCC 324 of the first BCU 320 via the signal line shown in FIG. 3A. Otherwise, the above-noted sixth output 360 in the form of "FALSE" value/condition is transmitted to the AND gate 316 of the outboard BCC 324 of the first BCU 320 via the signal line shown in FIG. 3A.

The above-noted fifth output 358 from the first module 300 of the inboard BCC 322 of the first BCU 320 is also transmitted to the AND gate 316 of the outboard BCC 324 of the first BCU 320 (via the internal serial transmitter 312a of the inboard BCC 322 of the first BCU 320 and the internal serial receiver 310b of the outboard BCC 324 of the first BCU 320). Receipt of both "TRUE" outputs 358, 360 by the AND gate 316 of the outboard BCC 324 of the first BCU 320 results in the corresponding shut-off valve driver 308 being activated. The shut-off valve driver 308 of the outboard BCC 324 of the first BCU 320 is operatively interconnected with the outboard dual brake control valve module 252 (FIG. 2), more specifically its corresponding shut-off valve(s), and when activated disposes its corresponding shut-off valve(s) in the open position. Activating the shut-off valve driver 308 (of the outboard BCC 324 of the first BCU 320) allows pressurized hydraulic fluid to be provided to the corresponding servo valve(s) of the outboard dual brake control valve module 252 for the aircraft braking system 200 of FIG. 2 (these servo valves being separately controlled as to the braking pressure that is ultimately applied to the corresponding brake(s) 240 of the aircraft braking system 200 (e.g., brakes 240 for the outboard wheels 234)). Otherwise, the shut-off valve driver 308 (of the outboard BCC 324 of the first BCU 320) is maintained in a deactivated state, for instance if at least one input in the form of a "FALSE" value/condition is received by the AND gate 316 (e.g., such that the shut-off valve(s) for the outboard dual brake control valve module 252 is maintained in its closed position such that pressurized hydraulic fluid is not provided to the corresponding servo valve(s) of the outboard dual brake control valve module 252 for the aircraft braking system 200 of FIG. 2).

For the case of operation (e.g., displacement) of the left pedal 212 of the first pedal pair 212, the operations described above by the first BCU 320 would be reversed between its inboard BCC 322 and its outboard BCC 324 (and using the pedal position sensors 212a/212b). It should also be appreciated that the foregoing is equally applicable to operation of the aircraft braking system 200 using the second pedal pair 220 and the corresponding components (e.g., where the shut-off valve driver 308 of the inboard BCC 332 of the second BCU 330 is operatively interconnected with the inboard dual brake control valve module 264, more specifically its corresponding shut-off valve(s); where the shut-off valve driver 308 of the outboard BCC 334 of the second BCU 320 is operatively interconnected with the outboard dual brake control valve module 262 (FIG. 2), more specifically its corresponding shut-off valve(s)).

The pedal position determination module 294, threshold/validity module 296, agreement/validity module (or comparison module) 298, and first module 300 each may be in software (although the noted function(s) could be provided in hardware). The pedal position determination module 292, the AND gate 304, and the AND date 316 may be in hardware (although the noted function(s) could be provided in software).

Figure 4:
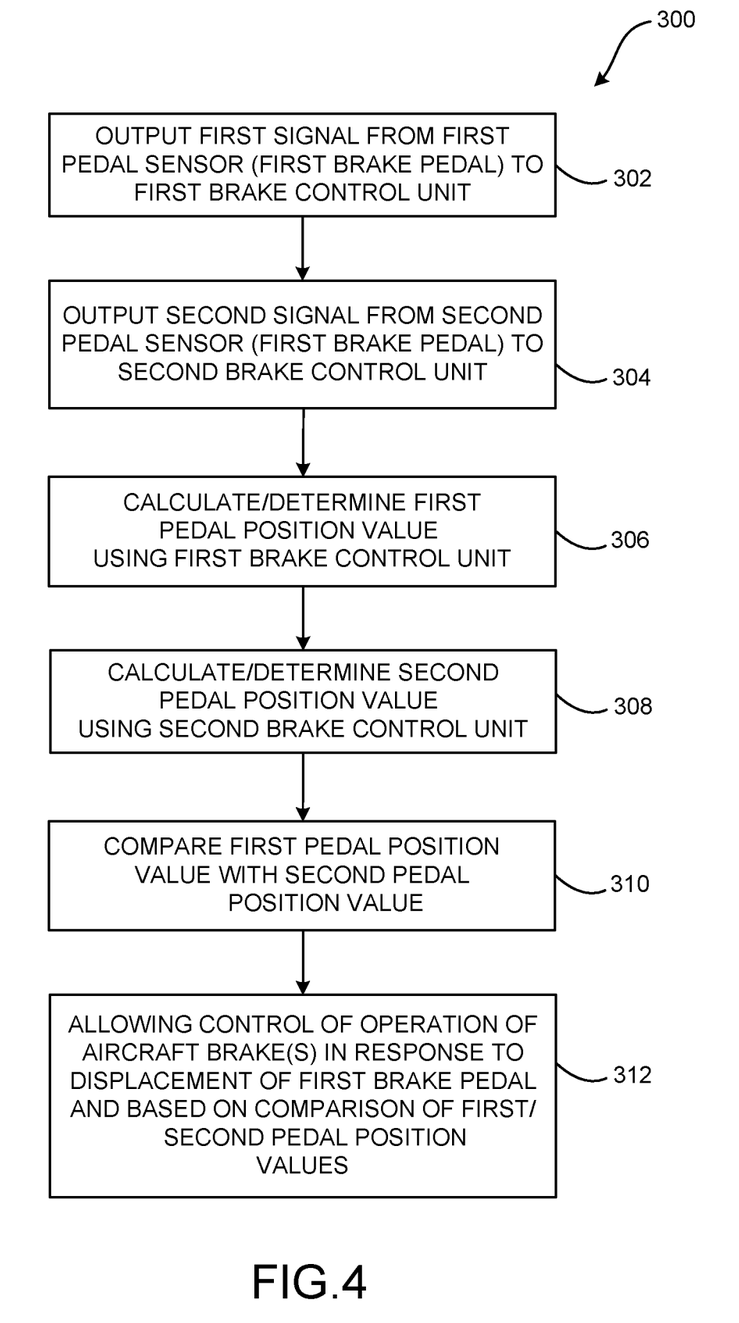
FIG. 4 is a flowchart of a method of controlling an aircraft braking system in accordance with various embodiments.

A method of controlling operation of an aircraft braking system is illustrated in FIG. 4 and is identified by reference numeral 300. A first signal from a first pedal sensor is output to a first brake control unit, where this first signal pertains to displacement of a first brake pedal (302). A second signal from a second pedal sensor is output to a second brake control unit, where this second signal also pertains to the displacement of the same first brake pedal (304). A first pedal position (e.g., a first software pedal position) is calculated/determined using the first brake control unit (306). A second pedal position (e.g., a second software pedal position) is calculated/determined using the second brake control unit (308). The first pedal position and the second pedal position are compared (310). Operation of the aircraft brake system is precluded (e.g., opening of a shut-off valve to provide pressurized fluid for operation of one or more aircraft brakes may not be allowed) in response to the existence of a first condition (312), where this first condition may include a comparison module receiving the first output from the first brake control unit, the comparison module receiving the second output from the second brake control unit, and the comparison module determining that the first output and the second output fail to comply with a first predetermined standard (e.g., the first output and the second output are not within a predetermined tolerance of one another).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft braking system comprising:
    a first pedal pair comprising a first pedal and a second pedal;
    a first pedal position sensor for said first pedal;
    a second pedal position sensor for said first pedal;
    a first brake control unit;
    a second brake control unit, wherein said first pedal position sensor is operatively interconnected with one of said first brake control unit and said second brake control unit and said second pedal position sensor is operatively interconnected with the other of said first brake control unit and said second brake control unit; and a first comparison module configured to compare a first output with a second output, wherein said first output is provided by said first brake control unit from an output of said first pedal position sensor and relates to a first pedal position of said first pedal, wherein said second output is provided by said second brake control unit from an output of said second pedal position sensor and relates to a second pedal position, and wherein said first brake control unit comprises said first comparison module;

wherein a first condition precludes operation of said aircraft braking system in response to displacement of said first pedal, said first condition comprising: 1) said first comparison module receiving said first output from said first brake control unit and receiving said second output from said second brake control unit; and 2) said first comparison module determining that said first output and said second output fail to comply with a first predetermined standard.

2. The aircraft braking system of claim 1, wherein said first output comprises both a validity and magnitude relating to said first pedal position, and wherein said second output comprises both a validity and magnitude of said second pedal position.

3. The aircraft braking system of claim 1, wherein one of said first brake control unit and said second brake control unit is a primary brake control unit and the other of said first brake control unit and said second brake control unit is a secondary brake control unit.

4. The aircraft braking system of claim 1, wherein said first brake control unit comprises a first outboard brake control card (BCC) and a first inboard BCC, wherein said second brake control unit comprises a second outboard BCC and a second inboard BCC, and wherein said first inboard BCC of said first brake control unit comprises said first comparison module.

5. The aircraft braking system of claim 4, wherein said first pedal position sensor is operatively interconnected with said first inboard BCC of said first brake control unit and said second pedal position sensor is operatively interconnected with said second outboard BCC of said second brake control unit.

6. The aircraft braking system of claim 5, wherein said first output is provided by said first inboard BCC of said first brake control unit and said second output is provided by said second outboard BCC of said second brake control unit.

7. The aircraft braking system of claim 5:
wherein said first inboard BCC of said first brake control unit comprises said first comparison module, a first module, and a second module;
wherein said first module utilizes a third output from said first comparison module and a fourth output, wherein said fourth output is provided by said first brake control unit from an output of said first pedal position sensor and relates to said first pedal position of said first pedal; and
wherein said first module outputs a fifth output to said second module.

8. The aircraft braking system of claim 7, wherein a sixth output is provided by said first brake control unit to said second module from an output of said first pedal position sensor and that relates to a third pedal position of said first pedal, and wherein said second module is operatively interconnected with a first shut-off valve driver that opens a first shut-off valve of said aircraft braking system when said fifth output satisfies a first condition and said sixth output satisfies a second condition.

9. The aircraft braking system of claim 8, wherein satisfaction of said first condition at least requires said first pedal position to be both above a first predetermined threshold and to be valid, and wherein satisfaction of said second condition at least requires said third pedal position to be above a second predetermined threshold.

10. The aircraft braking system of claim 8:
wherein said first outboard BCC of said first brake control unit comprises a third module;
wherein said first module also transmits said fifth output to said third module;
wherein said first inboard BCC of said first brake control until also transmits said sixth output to said third module; and
wherein said third module is operatively interconnected with a second shut-off valve that opens a second shut-off valve of said aircraft braking system when said fifth output satisfies said first condition and said sixth output satisfies said second condition.

11. The aircraft braking system of claim 10, wherein said first module transmits said fifth output to said third module via an internal serial transmitter of said first inboard BCC of said first brake control unit and an internal serial receiver of said first outboard BCC of said first brake control unit.

12. The aircraft braking system of claim 8, wherein said first and second pedal positions are digital values and said third pedal position is an analog value.

13. The aircraft braking system of claim 7, wherein said comparison module and said first module are each software modules and said second module is a hardware module.

14. The aircraft braking system of claim 13, wherein said second module comprises an AND gate.

15. The aircraft braking system of claim 4, wherein said first inboard BCC controls operation of at least one inboard aircraft brake and said first outboard BCC controls operation of at least one outboard aircraft brake.

16. The aircraft braking system of claim 4, further comprising:
a first external signal line between said first inboard BCC of said first brake control unit and said second outboard BCC of said second brake control unit, wherein said second output is provided by said second outboard BCC of said second brake control unit to said inboard BCC of said first brake control unit via said first external signal line.

17. An aircraft braking system comprising:
a first pedal pair comprising a first pedal and a second pedal;
a first brake control unit operatively interconnected with a first pedal position sensor for said first pedal;
a second brake control unit operatively interconnected with a second pedal position sensor for said first pedal;
wherein the first brake control unit is configured to compare an output of said first pedal position sensor with an output provided by the second brake control unit based on an output of said second pedal position sensor and to preclude braking operation if the comparison reveals that the first output and second output fail to comply with a first predetermined standard.

18. A method of controlling an aircraft braking system comprising a first pedal, a first brake control unit, and a second brake control unit, said method comprising:
outputting a first signal from a first pedal position sensor to said first brake control unit regarding a position of said first pedal;

outputting a second signal from a second pedal position sensor to said second brake control unit regarding said position of said first pedal;

said first brake control unit providing a first output that relates to a first pedal position of said first pedal;

said second brake control unit providing a second output that relates to a second pedal position of said first pedal;

comparing said first output with said second output; and precluding operation of said aircraft braking system in response to displacement of said first pedal and for a first condition comprising: 1) said comparing receiving said first output from said first brake control unit and receiving said second output from said second brake control unit; and 2) said comparing determining that said first output and said second output fail to comply with a first predetermined standard.

19. The method of any of claim 18, wherein said first brake control unit comprises a first outboard brake control card (BCC) and a first inboard BCC, wherein said second brake control unit comprises a second outboard BCC and a second inboard BCC, and wherein said first inboard BCC executes the comparing step.

20. The method of claim 19, wherein said providing a first output is executed by said inboard BCC of said first brake control unit and said providing a second output is executed by said outboard BCC of said second brake control unit.

* * * * *